United States Patent [19]
Gerber et al.

[11] 3,857,525
[45] Dec. 31, 1974

[54] PLOTTING SYSTEM

[75] Inventors: Heinz Joseph Gerber; Leonard G. Rich, both of West Hartford; Ronald Bruce Webster, Melrose; Robert Louis Martino, Ellington, all of Conn.; Earle Merritt Chase, Wilbraham, Mass.; Anthony D'Onofrio, West Hartford, Conn.

[73] Assignee: The Gerber Scientific Instrument Company, South Windsor, Conn.

[22] Filed: Apr. 20, 1973

[21] Appl. No.: 353,117

[52] U.S. Cl. .......................... 242/57.1, 242/67.3 R
[51] Int. Cl. ............................................. G65h 25/26
[58] Field of Search ......... 242/57.1, 67.3 R; 226/15, 226/20; 352/241

[56] References Cited
UNITED STATES PATENTS

| | | | |
|---|---|---|---|
| 1,972,075 | 9/1934 | Clark | 242/57.1 |
| 2,432,229 | 12/1947 | Dern | 346/70 |
| 2,967,675 | 1/1961 | Markey | 242/57.1 |
| 3,085,761 | 4/1963 | Evers | 242/57.1 |
| 3,132,253 | 5/1964 | Sorsen | 242/57.1 X |
| 3,570,735 | 3/1971 | Kurz | 242/57.1 |
| 3,681,779 | 8/1972 | Darnell | 346/136 |
| 3,726,031 | 4/1973 | Singer | 242/57.1 |
| 3,759,457 | 9/1973 | Edes et al. | 242/57.1 |

Primary Examiner—John W. Huckert
Assistant Examiner—Edward J. McCarthy
Attorney, Agent, or Firm—McCormick, Paulding & Huber

[57] ABSTRACT

A plotting system utilizing a drum plotter includes apparatus for steering a strip of recording paper or other recording material as the paper is fed back and forth by a plotting drum relative to a plotting head. The strip of paper is fed back and forth between two storage reels which are located at opposite sides of the plotting drum and the angular relationship of the storage reels relative to the plotting drum is controlled by servomotors to achieve steering of the paper as it passes over the drum. Between each of the storage reels and the plotting drum is a vacuum trough in which the strip of recording paper is accumulated to make paper immediately available during rapid movements of the plotting drum. The walls of the vacuum trough over which the paper is pulled have a waffled surface to reduce the area contacting the paper and the electrostatic charge build-up. The plotting head carries a slender shaft of consumable marking material, such as pencil lead or graphite, which is capable of producing uniform line intensity at any plotting speed as long as a light stylus pressure is applied to the shaft. By plotting a mirror image of a desired graphic display with a lead containing a dye, it is possible to produce a master from which duplicate copies of the graphic display can be printed in a conventional dye transfer process.

20 Claims, 13 Drawing Figures

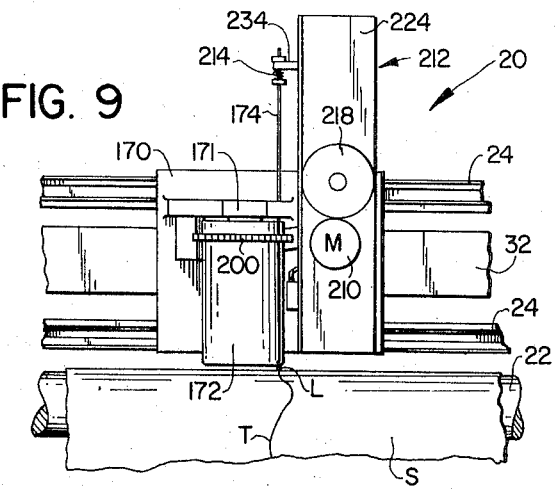
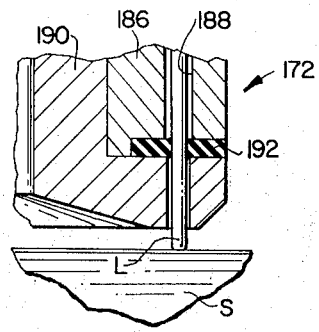
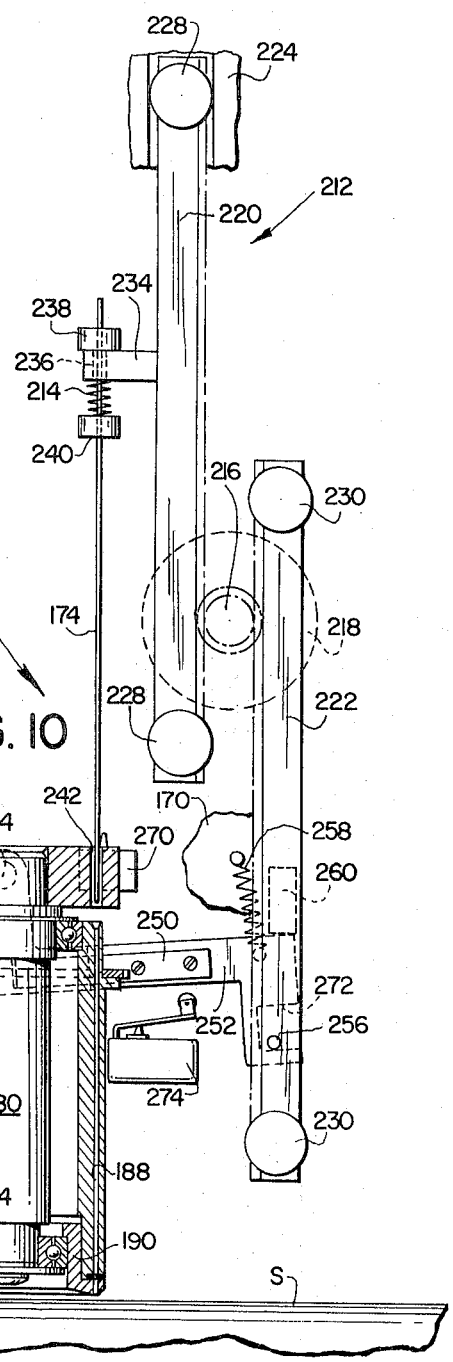
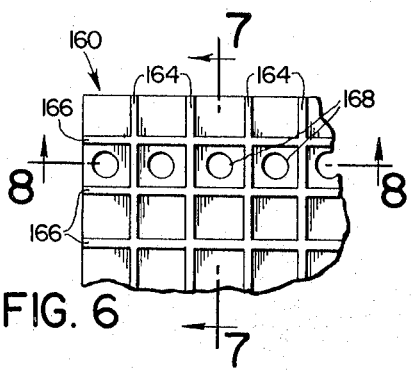
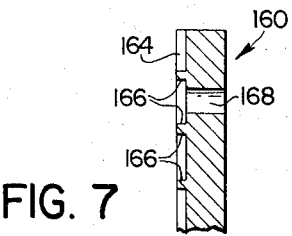
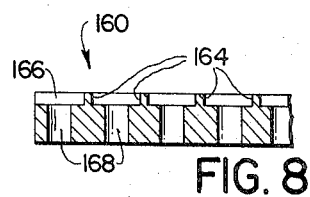

PLOTTING SYSTEM

BACKGROUND OF THE INVENTION

The present invention relates to mechanisms in which a sheet of recording material and a plotting head are moved relative to one another in a controlled manner to produce a graphic display either directly on the recording material or on other mediums in a subsequent developing or printing process. More particularly, the present invention in its several aspects relates to the apparatus by which the recording material is moved relative to a plotting head, plotter constructions and methods of operation and a method of producing duplicate copies of a graphic display generated from a plotting system.

In a plotting system in which a recording medium such as a strip of recording paper is moved relative to a plotting head, there is usually great consideration given to the manner in which the paper is translated relative to the plotting head because the positioning of the paper relative to the head has a direct bearing upon the accuracy with which a resulting graphic display is produced. U.S. Pat. No. 3,102,701 entitled "Chart Positioning Mechanism For Data Reading Apparatus" having the same assignee as the present invention discloses a plotter in which the strip of recording paper is steered by varying the angular relationship of the reel on which the paper is stored relative to the remaining plotting structure. Also U.S. Pat. No. 3,759,433 entitled "Method And Apparatus For Transporting A Strip Of Recording Material" having the same assignee as the present invention discloses a drum-type plotter similar to that disclosed hereinafter in which a special driving system is utilized to advance the recording material relative to a plotting drum with minimum positioning error at the drum. The referenced patent and patent application are merely examples of the type of art to which the present invention relates and illustrate the concern that exists for the accurate movement of recording material through a plotter.

Another aspect of the positioning problem deals with the electrostatic forces generated between a recording material and the structure over which the material must slide or be dragged. Electrostatic forces which attract the material to adjacent plates or rolls increase the load imposed upon the servodrive mechanism and the engagement apertures in the material which position the material relative to the plotting head. Obviously, it is desirable to either eliminate or at least minimize the buildup of electrostatic forces and, to this end, many plotting systems include electrostatic discharging circuitry connected to appropriate structure along the path traversed by the recording material as it moves toward or away from the plotting head. One of the most important characteristics of a plotter is its ability to produce graphic information of uniform high quality. Quite apart from accuracy, the graphic information should be clear, of high contrast and uniform intensity. With the advent of numerically controlled plotters and higher plotting speeds, the difficulty of maintaining traces of uniform character and high contrast at many different plotting speeds has led to controlled inking systems such as disclosed in U.S. Pat. application Ser. No. 218,143, filed Jan. 17, 1972, now U.S. Pat. No. 3,781,907, and entitled "Apparatus For Expressing Writing Fluid From A Plotting Pen" issued to the assignee of the present invention. Plotting heads capable of maintaining high quality line characteristics at all speeds are still being striven for.

In selected industries such as the clothing industry, it is desirable to produce duplicate copies of graphic information which is reduced to a visible form by numerically controlled plotter. The generation of duplicate copies in the past has been performed by forming a sandwich structure comprised of a blank sheet and a sheet impregnated with a dye stuff which can be readily transferred to the blank sheet under the pressure of a stylus. The stylus is mounted in a numerically controlled plotting head and traces the graphic pattern on the sandwich structure spread on a plotting table so that a mirror image of the graphic display is produced on the blank sheet. The blank sheet then serves as a master for producing duplicate copies in a conventional dye transfer or ditto process. It will be understood that a large amount of waste is associated with this process since both the blank sheet and the impregnated sheet must be coextensive but the only dye transferred to the blank sheet is that lying along the traces traversed by the stylus to define a visual image of the graphic information.

It is accordingly a general object of the present invention to disclose a plotting system in which specific solutions to many of the above-referenced problems are given.

SUMMARY OF THE INVENTION

The present invention resides in a plotting system in which a strip of recording material advances relative to a plotting head in a controlled manner to cause a marker on the head to generate intelligence on the recording material. The intelligence generated may be a graphic display which is either immediately visible or subsequently made visible in a developing or printing process. In many respects, the present invention is also applicable to data handling systems such as line followers which are functionally equivalent to a plotter except that information is read or retrieved rather than recorded. Accordingly, reference hereinafter to a plotting system may be viewed as also being applicable to equivalent data handling equipment unless obviously concerned with plotting alone.

In one aspect of the invention, a strip of sheet material, most often recording material such as paper or plastic films, is caused to track or be guided relative to a data head in a very precise manner by apparatus which winds the strip of material onto a rotatably driven reel. The apparatus includes sensing means for detecting the lateral position of the strip and motor means to adjust the angular position of the reel relative to the longitudinal direction of the strip in response to the sensing means as the strip is wound onto the reel.

In another aspect of the present invention, the strip of sheet material is steered from a storage reel toward a drum over which the data head operates. The drum is provided with a set of fixed drive sprockets at one axial end and another set of axially adjustable sprockets at the other end, each set of sprockets engaging apertures along the longitudinal edges of the strip. The axially adjustable sprockets permit the strip to expand or contract in the lateral direction and by spring-biasing the sprockets away from the fixed sprockets, the sheet material can be stretched in one direction over the drum. Means are provided for shifting the strip of sheet material to a laterally offset position in advance of the drum as the strip moves toward the drum to improve the tracking of the material over the drum. The axially shiftable set of sprockets is not capable of applying strong axial forces to stretch the material laterally as the strip passes over the drum. The strip in the position offset to the same side as the shiftable sprockets is induced to "walk" toward the axial end of the drum carrying the shiftable sprockets. The fixed sprockets resist the tendency of the strip to "walk" toward the opposite end of the drum and thereby stretch the strip in a flat condition at a desired axial position on the drum.

Another aspect of the present invention relates to an apparatus and method for supporting the moving sheet material to reduce the electrostatic charge generated between the support and the material. The apparatus employs a plate having a waffled surface which minimizes the area of contact between the plate and the material and correspondingly reduces the drag forces on the material. Such plates are advantageously employed in vacuum troughs at each side of a drum over which a data head operates.

Another aspect of the invention relates to a plotting head which employs a slender shaft of consumable marking material, for example pencil lead. Support means hold the shaft of the consumable marking material in a plotting position with one end of the shaft adjacent a recording medium such as a strip of recording paper. Means are provided for pressing one end of the shaft toward the recording medium as the one end is consumed. Utilizing a consumable marking material has several advantages. In situations where the material takes the form of a graphite stick or the like such as used in mechanical pencils, the line traces produced by the plotting head have a uniform intensity and width regardless of the relative speeds of the plotting head and recording medium.

In another aspect of the present invention, the plotter is utilized to produce masters from which duplicate copies of the graphic information can be reproduced. The method of producing duplicate copies includes installing a marking material containing a transfer dye in the plotting head and causing the plotter to automatically draw line traces defining an image of a graphic display on the recording medium with the marking material. Printing of a copy of the graphic display is then accomplished by transferring at least some of the dye from the line traces defining the image on the recording medium onto a blank material. The printing can be repeated for as many copies of the display as desired until the dye on the master formed by the recording medium is exhausted.

BRIEF DESCRIPTION OF THE DRAWINGS

FIG. 6 is a plan view of a guide plate which produces reduced electrostatic charge when the recording material slides over the plate.

FIG. 7 is a cross-sectional view of the plate in FIG. 6 as viewed along the sectioning line 7—7.

FIG. 8 is a cross-sectional view of the plate in FIG. 6 as viewed along the sectioning line 8—8.

FIG. 9 is an elevation view of the plotting head illustrated in FIG. 1.

FIG. 10 is an enlarged cross-sectional view of the plotting head in FIG. 9 with portions removed for clarity.

FIG. 12 is an enlarged cross-sectional view showing a fragmentary portion of the magazine for holding consumable marking material.

DESCRIPTION OF THE PREFERRED EMBODIMENTS

Figure 1:
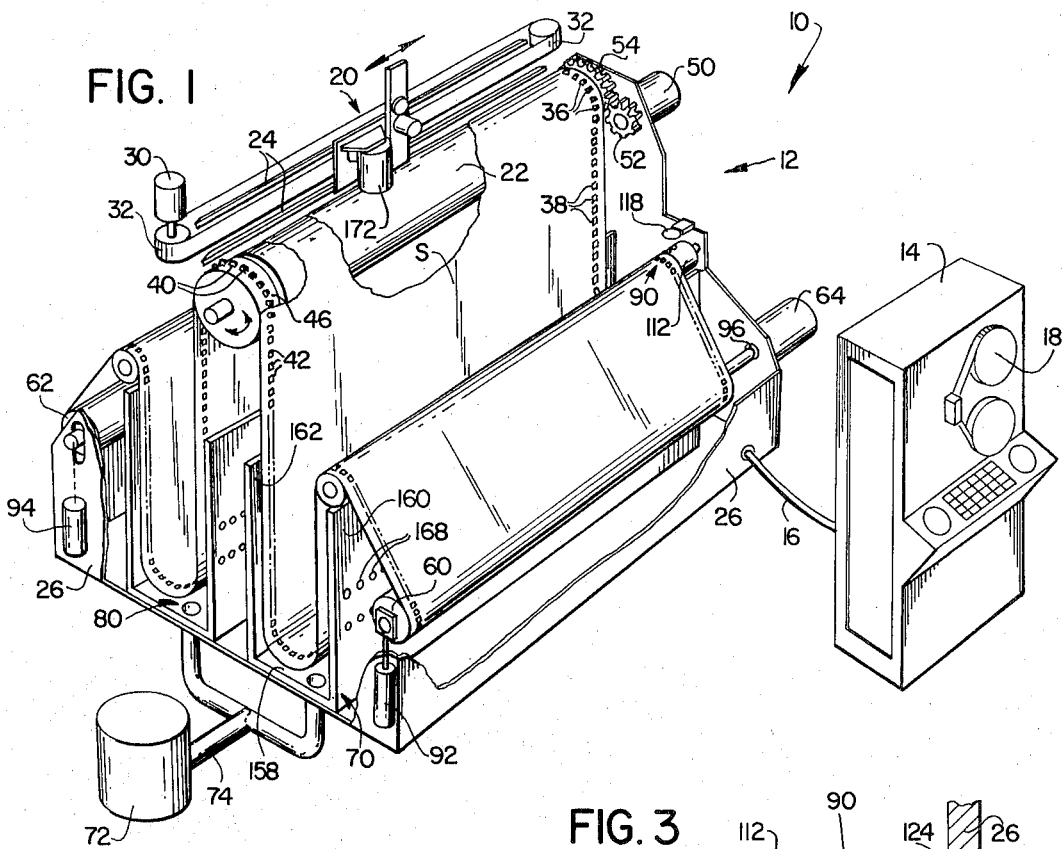
FIG. 1 is a perspective view of a plotting system including a drum plotter in which the present invention is employed.

FIG. 1 shows an automatically controlled plotting system, generally designated 10, in which the present invention is embodied. The plotting system is comprised basically of a drum plotter 12 and a controller 14 which transmits command signals through a cable 16 to the plotter to control a plotting operation. The controller 14 may derive information to be plotted from a program tape 18, or, alternatively, may be supplied directly with information "on-line" for plotting. One type of controller which is contemplated for use with the drum plotter 12 incorporating the present invention handles numerical control information in digital form; however, the particular type of controller employed is not of critical importance to the present invention.

The drum plotter 12 is comprised primarily of a plotting head 20 and a plotting drum 22 which advances a strip of recording material S longitudinally of itself and relative to the plotting head 20. The plotting head, in turn, is mounted on a pair of guide rails 24 for movement over the plotting drum 22 in a direction parallel to the axis of the plotting drum and laterally of the strip S. In some embodiments of the invention, the head 20 may be a data head which receives information from the recording material rather than imparts information to the material. The guide rails 24 are connected to the frame 26 of the drum plotter which is partially broken away to disclose the feedpath followed by the strip of material over the drum 22. A plotting head drive motor 30 suitably mounted on the frame 26 is connected to the head 20 by a toothed pulley and belt mechanism 32. The drive motor 30 receives command signals from the controller 14 to translate the plotting head 20 in a controlled manner over the strip of recording material during a plotting operation.

The strip S of recording material is fed longitudinally back and forth relative to the head 20 by the plotting drum 22 which has a smooth, central plotting surface on which the material rests. The material may be a high quality plotting paper, plastic material, a photosensitive material, or any other type of sheet material on which graphic information is to be recorded or is already recorded. At one axial end, the drum 22 includes a set of drive sprockets 36 which engage corresponding apertures 38 extending in a row along the adjacent longitudinal edge of the strip S. At the opposite end of the drum 22 is another set of drive sprockets 40 which engage a corresponding row of apertures 42 along the adjacent edge of the strip. The drive sprockets 36 are fixedly mounsed in the plotting drum 22 at the one axial end; however, the drive sprockets 40 at the opposite axial end are mounted on an axially shiftable member 46 to accommodate lateral contraction or expansion of the strip of recording material due to variations in humidity, temperature and other factors which affect the dimensions of the material. The sprockets 40 and the shiftable member 46 are resiliently biased away from the sprockets 36 at the opposite axial end of the drum in order to stretch the strip of recording material laterally as it passes over the drum. Such stretching prevents bunching and possible tearing of the material and insures that the material lies flat on the smooth, central plotting surface of the drum 22 as the material moves underneath the plotting head 20. A plotting drum of this type is disclosed in copending U.S. patent application Ser. No. 353,116 filed Apr. 20, 1973 and entitled "Plotter System and Method of Operation," the disclosure of which is incorporated herein by reference.

A drive motor 50 for the plotting drum 22 is mounted to the frame 26 at the axial end adjacent the fixed sprockets 36 and is coupled to the drum by means of a pinion gear 52 on the end of the motor shaft and the drive gear 54 fixed to the axial end of the drum 22. The drive motor 50 also receives commands from the controller 14 to regulate the rotation of the drum 22 and corresponding longitudinal displacement of the recording material during the plotting operation. It will be readily understood that composite movements of the plotting head 20 and the drum 22 will generate relative movement between the plotting head and the strip of recording material in two coordinate directions and will therefore enable two dimensional graphic information to be plotted on the recording material in accordance with the program defined by the tape 18 or other input device connected with the controller 14.

The longitudinal ends of the strip S of recording material are wound on storage reels 60 and 62 mounted respectively to the frame 26 at opposite sides of the plotting drum 22. Each of the reels is driven by a reversible servomotor 64 (only one visible on reel 60) to periodically wind the recording material onto or off of the reels on damand. The strip of recording material passes through a vacuum trough 70 interposed between the drum 22 and the reel 60. The bottom wall 158 of the trough 70 is connected to a vacuum pump 72 through conduit 74. The ends of the trough 70 are sealed by the frame 26 so that when the lower portion of the trough 70 is evacuated, the loop formed by the strip of recording material in the trough is pulled downwardly and thereby draws the portion of the strip passing over the drum 22 tightly against the drum. A corresponding vacuum trough 80 is interposed between the storage reel 62 and the plotting drum and is also connected to the conduit 74 to pull the loop formed in the trough downwardly and maintain the recording material tightly drawn over substantially 180° of the drum 22.

The vacuum troughs 70 and 80 are accumulators making an adequate supply of the recording material immediately available for movement onto the drum 22. The lengths of the loops in the troughs are controlled to provide a substantially constant quantity of recording material available at each side of the plotting drum 22 at all times. In the context of the present invention, one prior art loop control mechanism which is suitable for controlling the loop length in an associated vacuum trough 70 or 80 employs a photocell located at one side wall of the trough to read a linear light source arranged vertically on the opposite side wall. The loop interrupts light passing from the source to the photocell and causes the cell to produce a signal varying as a direct function of the length of the loop interrupting the light source. The signal from the photocell is then utilized to control the rotational velocity of the servomotor 64 and corresponding reel 60 or 62 which supplies or receives recording material from the trough 70 or 80 containing the photocell. With an appropriate bias, the signal from the photocell establishes a polarized error signal reversibly driving the servomotor 64 at a proportional velocity. Zero error exists at the mean or desired loop length in the trough. Driving the servo motors 64 at velocities proportional to the error signal ensures an appropriate supply of recording material in each trough 70 or 80 at all times if the servomotor velocities are caused to exceed the maximum feed rate of the drum 22 well before the loops in the respective troughs are expended or extend to the bottoms of the troughs. Accordingly, rapid motions of the drum generated by the drive motor 50 are accommodated without requiring the servomotors 64 on the storage reels 60 and 62 to precisely track or follow the rotations of the drum 50. Furthermore, with an adequate supply of recording material immediately available, short-term, high-speed rotations of the drum are not impeded by large inertial loads or drag forces that would be associated with corresponding rotations of the storage reels and material wound thereon. Accordingly, the drum plotter 12 is designed for high-response operation and accurate data recording or reading.

In high-speed, high-accuracy plotters of the type illustrated, handling of the recording material is very critical to the accuracy of the graphic information displayed on the material and is a source of concern. For example, when the strip S is moved longitudinally, slight lateral movements are experienced. If the lateral movements become too severe, it is very possible that the material will shift axially on the drum 22 and cause the sprockets 36 and 40 to become disengaged from the apertures 38 and 42 respectively. The immediate result during high speed translations is a bunching and possible tearing of the plotting paper in the vicinity of the drum which, of course, destroys a portion of the graphic information already recorded and ruins the overall plot.

In accordance with one aspect of the present invention, the lateral movements of the strip are controlled to cause more precise tracking over the plotting drum 22. It has been noted that strips of recording material tend to hunt axially back and forth on the storage reels 60 or 62 as the material is wound onto the drum. This hunting causes the longitudinal edge of the strip to form a cyclic helix pattern in the segment rolled on the reel and consequently the hunting is sometimes termed "helixing." The undesirable feature of helixing is that it reflects upon the axial positioning or tracking of the strip in the vicinity of the plotting drum 22 in two ways.

Firstly, the mere shifting of the strip axially along the reel 60 produces corresponding lateral displacements of the strip segment between the plotting drum 22 and the reel 60 as the material is wound onto the reel. Secondly, when the plotting drum rotation 22 is reversed and recording material is paid off of the storage reel 60, the lateral position of the strip varies in the same manner as the strip hunted when it was previously wound onto the reel. Such lateral shifting affects the movement of the strip over the plotting drum 22 with the potential for bunching and tearing as mentioned above. It is, accordingly, desirable to control the axial hunting of the strip as it is wound onto the reels 60 or 62.

To this end, a light sensor 90 detects the lateral position of the strip S as the strip is wound onto the reel 60. The sensor 90 controls a servomotor 92 mounted on the frame 26 and connected to one end of the reel 60 so that the angular relationship or tram of the reel 60 relative to the plotting drum 22 and the strip S can be varied. Variations in the angular relationship of the reel and strip tend to force the strip toward one axial end of the reel or the other as the strip is wound onto the reel. Accordingly, when the sensor 90 detects a lateral movement of the strip toward one side of the plotter 12, the servomotor 92 varies the angular position of the storage reel 60 pulling the strip in to force the strip back toward a central or other desired position. A corresponding sensor (not visible) and servomotor 94 control the angular position of the storage reel 62 relative to the plotting drum 22 and the strip in the same manner whenever the strip is being wound onto the reel 62. Since the operation and control of the reel 60 and the reel 62 are the same, the discussion immediately below deals only with the sensor 90 and servomotor 92 associated with reel 60.

The reel 60 is supported in the frame 26 by means of journal bearings at each axial end. The journal bearing 96 is mounted in a stationary position in the frame 26 at one end of the reel. As shown in greater detail in FIG. 2, however, the journal bearing 100 at the opposite or near end of the storage reel 60 is mounted in a slide block 102 which is vertically adjustable as indicated by the arrow 104. The axle 106 of the reel 60 extends through a vertical slot 108 in the frame 26 to permit the one end of the reel to move up and down with the slide block 102 and thereby vary the angular relationship of the reel relative to the strip. The servomotor 92 has a movable output member 110 connected to the slide block 102 to control the position of the block and correspondingly the angular position of the reel 60.

Figure 3:
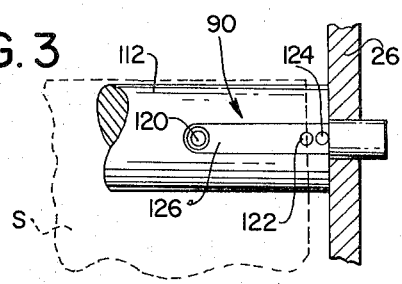
FIG. 3 is a fragmentary plan view showing one end of a material guide bar and a sensor detecting the longitudinal edge of the material.
Figure 2:
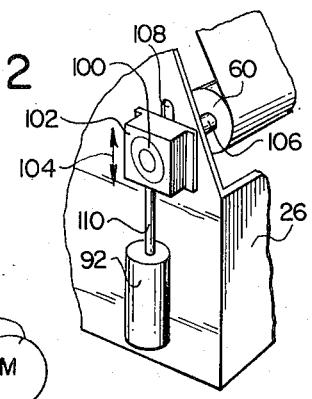
FIG. 2 is a fragmentary perspective view showing one corner of the drum plotter and one end of the paper storage reel in detail.

FIG. 3 illustrates the light sensor 90 which controls the servomotor 92 in FIGS. 1 and 2. The sensor 90 is mounted in a stationary support beam or guide bar 112 fixedly mounted in the frame 26 so that the strip S of recording material passes over the bar as it leaves the vacuum trough 70 during movement toward the storage reel 60. The sensor 90 is located in a recessed manner in the guide bar 112 at a position over which the one longitudinal edge of the strip passes. In this position, the sensor detects the lateral location of the strip at a station slightly in advance of the storage reel 60.

The sensor is comprised of a light source 118 mounted from the frame 26 immediately above the guide bar as shown in FIG. 1 and three photoresistive cells 120, 122 and 124 extending in a linear array along the bar in a recessed support plate 126. The photocell 122 is positioned between the cells 120 and 124 and at the nominal or desired position of the longitudinal edge of the strip being sensed. The cell 120 is located inwardly of the longitudinal edge so that it is always covered by the strip within the anticipated lateral movements of the strip. The photocell 124, on the other hand, is located outwardly of the longitudinal edge so that it is not covered by the strip during anticipated lateral movements. Accordingly, with the light 118 turned on, photocell 120 provides a reference signal corresponding to a completely covered cell while photocell 124 provides a reference signal corresponding to a completely uncovered cell. The intermediate photocell 122 which is partially covered and partially uncovered produces a signal which varies between the two reference signals established by cells 120 and 124 in accordance with the lateral position of the strip as it passes over the sensor 90.

Figure 4:
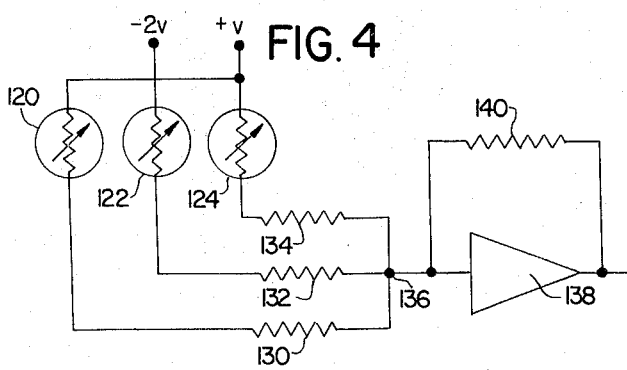
FIG. 4 is an electrical control circuit illustrating the sensors shown in FIG. 3.

FIG. 4 illustrates the electrical control circuit including the photoresistive cells and servomotor 92. The three photocells are connected respectively to three equal summing resistors 130, 132 and 134 and a common summing point 136. The cells 120 and 124 are energized by a positive voltage, +V, while the intermediate photocell 122 is energized by a negative voltage, −2V. The circuit formed by the resistors and photocells is an averaging circuit and, assuming proper balance, will produce a null signal at the summing point 136 whenever the longitudinal edge of the recording material is precisely centered over the cell 122. Whenever the longitudinal edge shifts away from the center to expose more or less of the cell 122, a polarized voltage signal appears at the summing point 136 and drives the operational amplifier 138 having feedback resistor 140 to energize the servomotor 92. The phasing of the control circuit is such that if the strip of recording material moves toward the photocell 124 and causes the photocell 122 to be covered, the output member 110 of the servomotor 92 in FIG. 2 moves the slideblock 102 and corresponding end of the reel 60 upwardly. In this condition, the recording material has a tendency to "walk" or shift axially along the rotating reel 60 toward the slide block 102. Conversely, if the edge of the recording material tends to shift toward the photocell 120 and uncovers photocell 122, the output member 110 of the servomotor 92 moves the slideblock and corresponding end of the reel 60 downwardly. The recording material then tends to "walk" toward the axial end of the reel 60 opposite slideblock 102. The motions of the one end of the reel tend to reverse the lateral movements sensed and, consequently, reduce the amplitude of the hunting motions or helixing experienced at the reel 60. Reduction of the hunting motion reduces corresponding lateral movements of the strip throughout the segment between the plotting drum 22 and the reel and also insures reduced movements when the longitudinal motion of the strip is reversed. More accurate feeding of the strip over the plotting drum results.

It will be noted that by use of the three photocells in the sensor 90, the control system is insensitive to variations in the light level and transparency of the recording material since the cells 120 and 124 provide reference signals for the extreme values to be expected from cell 122, and the averaging circuit shown in FIG. 4 produces a null condition at the summing point 136 whenever recording material is centered on the cell 122 regardless of the intensity of the light 118. Accordingly, ambient light may be used instead of the light 118 provided that localized shadows will not exist near the sensor. Furthermore, when the strip of recording material is completely removed from the plotter 12, the servomotor 92 and reel 60 move to the centered position.

It should be understood that only one sensor and servomotor operate at one time and the operating sensor and servomotor always operate upon the storage reel receiving the recording material. The controller 14 is capable of determining the sense of longitudinal strip motion and energizes the sensors and servomotors accordingly.

In accordance with another aspect of the present invention, the strip of recording material is steered onto the plotting drum 22 from the storage reel 60 or 62 from which the strip is being unwound. In the plotter 12, the drum 22 possesses the set of fixed drive sprockets 36 at one axial end and the shiftable drive sprockets 40 on the member 46 at the opposite axial end to accommodate shrinkage and expansion of the recording material in the lateral direction. The member 46 is biased axially by a very slight pressure which permits shrinkage of the material to pull the member axially toward the fixed sprockets 36. Drifting of the strip toward the end of the drum carrying the fixed sprockets 36 is not significantly retarded because the member 46 engaged by the apertures 42 must yield to the recording material if it shrinks and the fixed sprockets 36 engaged by the apertures 38 are incapable of restraining drifting of the strip toward the sprockets due to the low buckling strength of recording material, particularly wide strips of recording material or strips having a very fine thickness. On the other hand, the fixed sprockets are readily capable of restraining drifting toward the opposite end of the drum. Accordingly, the servomotors 92 and 94 are utilized to steer the strip toward the axial end of the drum 22 having the shifting member 46.

Figure 5:
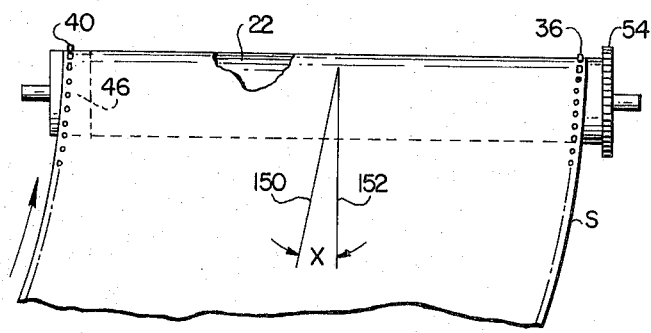
FIG. 5 is a fragmentary front elevational view of the plotting drum and recording paper in accordance with one aspect of the present invention.

To steer the strip onto the drum, the strip of recording material is laterally offset intentionally in advance of the drum as the strip moves towards the drum. This offset is produced by adjusting the angular relationship of the storage reel from which the strip is being fed relative to the drum. In particular, if the strip of recording material is moving from the reel 60 toward the drum 22, the servomotor 92 moves the slideblock 102 shown in FIG. 2 downwardly. The longitudinal edge of the recording material adjacent the end of the reel 60 attached to the slideblock 102 is pulled slightly back over the guidebar 112 relative to the opposite longitudinal edge of the strip. The unbalanced displacement of the longitudinal edges in this manner causes the loop of material in the vacuum trough 70 to be displaced slightly upward at the one end and in the lateral direction toward the end of the trough adjacent the servomotor 92. Consequently, the strip approaches the plotting drum 22 from a lateral position slightly offset from a center position as illustrated more clearly in FIG. 5. The angular relationship of the center line 150 of the offset strip and the nominal center line 152 is indicated by the angle X. The offset position of the strip in FIG. 5 is greatly exaggerated for illustration purposes only. In fact, only a slight offset of approximately one-fourth inch to the near side necessary for a strip three feet wide at a point in the feed path about three feet from the drum in order to induce a tendency of the strip to always drift over the drum 22 toward the axial end carrying sprockets 40. The fixed sprockets 36, however, prevent actual movement of the strip and maintain the strip precisely centered on the plotting drum 22 under the plotting head 20. By inducing strip movement away from the sprockets 36 and toward the sprockets 40, the inability of the member 46 to restrain strip movements in the opposite direction becomes moot.

It will be readily understood that the control of servomotor 92 to provide lateral offset in the strip can be readily obtained with the control circuit illustrated in the FIG. 4 by disconnecting the averaging circuit including photoresistive cells 120, 122 and 124 at the summing point 136 and driving the amplifier 138 with a fixed energizing signal of appropriate polarity to move the slide block 102 down each time the direction of rotation of plotting drum 22 draws the recording material from the reel 60. The controller 14 may detect each change in direction of drum rotation from the program tape and provide the appropriate energizing signal accordingly. Of course, servomotor 94 and reel 62 are operated in precisely the same manner when the plotting drum 22 draws the recording material from the reel 62.

Another aspect of the present invention relates to a method and apparatus for reducing electrostatic forces which impede the motion of the recording material toward or away from the drum 22. As mentioned above, the loops of material accumulated in the vacuum troughs 70 and 80 relieve the tasks of servomotors 64 and reduce the load between the strip apertures, the plotting drum and the drivemotor 50 which rotates the drum. However, since the recording material is dragged or slides over the vertical walls of the troughs 70 and 80, electrostatic drag forces are generated and impede the movement of the material, particularly where the strip has a lateral dimension in the order of three feet or more.

To this end, the vertical walls or sideplates 160 and 162 of the trough 70 are specially designed to minimize the electrostatic charge build up between the recording material and the trough 70. Of course, the vertical walls of the trough 80 would have a corresponding design.

FIGS. 6–8 illustrate a fragment of the wall 160 which reduces the electrostatic charge generated between the recording material and the trough 70. The reduction is obtained generally by minimizing the surface area of the walls or plate which comes in contact with the recording material as it slides through the trough. Minimizing the contact area on the inwardly facing sides of the wall is obtained with a waffled surface formed by one set of parallel ridges 164 and another set of parallel ridges 166 intersecting the ridges 164 in generally perpendicular relationship. Both sets of ridges 164 and 166 have flat peaks which are coplanar so that the recording material makes contact with the limited surface area of the peaks.

In a preferred form of the vacuum troughs 70 and 80, the ridges 164 extend vertically in the troughs on the inwardly facing sides of the walls 160 and 162 and the ridges 166 extend horizontally or in a direction perpendicular to the movement of the strip through the trough. Since the vacuum pump 72 is connected to the bottom wall 158 of the trough, it is possible for a reduced pressure to exist between the recording material and the vertical walls 160 and 162 and to thereby increase friction drag as well as electrostatic charge buildup. To relieve this situation, the vertical walls 160 and 162 are provided with a series of pressure equalization channels or apertures 168 which extend from the exterior side of the walls to the interior side between the ridges and adjacent the recording material. Any regions of reduced pressure accordingly are relieved through the channels 168. Furthermore, the ridges 166 extending generally perpendicular to the movement of the strip prevent the low pressure region at the bottom of the troughs from working upwardly between the walls and the material.

Another aspect of the present invention relates to the head 20 in a form particularly designed to plot graphic information on the strip of recording material by means of a consumable marking material which produces line traces on the strip as the head and strip move relative to one another.

FIG. 9 shows in elevation the data head 20 which is specifically adapted to plot line traces T on the strip S with a consumable marking material. In particular, the plotting head may be filled with a graphite cartridge or pencil lead L that rests on the strip S over the plotting drum 22 as the head 20 and strip are moved relative to one another. Although graphite is mentioned in particular, any slender shaft of consumable marking material including pastels, crayons or dye markers may be used with equally satisfactory results. The advantage of using a shaft of consumable marking material, particularly pencil lead, is that the intensity of the traces produced by the lead remains substantially constant regardless of the relative speed between the strip and head. Uniform line width is maintained due to the constant cross-section of the lead. Because of its consumable characteristics, however, it is necessary to provide a feed mechanism which continually advances the lead as the end of the lead resting against the sheet material is consumed. In one embodiment of the head, a plurality of leads are carried so that a great deal of plotting can be performed between refilling operations, or multicolored graphic displays can be made.

As illustrated in FIG. 9, the plotting head 20 includes a carriage plate 170 which rides on the parallel guide rails 24 back and forth over the plotting drum 22 and the strip S in response to the controlled movements of the drive motor 30 (FIG. 1) and the toothed belt and pulley mechanism 32. Attached to a bracket 171 on the carriage plate 170 is a magazine 172 in which a plurality of pencil leads L or other consumable marking material are carried. A feed ram 174 registers with one of the leads in the magazine and presses the lower end of the lead against the strip S during a plotting operation. As the lower end of the lead is consumed, the ram also feeds the lead through the magazine toward the plotting drum 22. When the end of a line trace is reached, the pressure applied by the ram 174 to the lead is released and in the absence of the pressing force, the lead does not produce a trace. When the entire lead is consumed, the ram 174 is withdrawn from the magazine 172 and the magazine is indexed to bring another lead under the ram for continued plotting. A more detailed description of the plotting head 20 follows in connection with the description of FIGS. 10 – 12.

The magazine 172 is rotatably mounted on the carriage plate 170 by means of a stationary support shaft 180 suspended at its upper end in fixed relationship from the bracket 171 and a pair of roller bearings 182 and 184 interposed between the shaft 180 and the magazine. The bearings 182 and 184 hold the magazine against axial displacement on the shaft 180 so that the ram 174 can press the lead L downwardly relative to the magazine onto the strip S of the recording material.

The magazine includes an outer barrel 186 having a plurality of evenly spaced channels or compartments 188 in a circular array and parallel to the axis of rotation of the magazine for housing the leads L in loose fitting or sliding relationship. Between the lower end of the barrel 186 and the bearing 184 is a flanged collar 190 which contains apertures registering with the channels 188 so that the lead L can be pressed out of the bottom of the magazine onto the recording material. Interposed between the collar 190 and the barrel 186 as shown clearly in FIG. 12 is a flexible gasket 192 having an aperture for each of the channels 188; however, the apertures in the gasket are slightly smaller in cross-section than the channels so that a piece of lead which slides through the channels in the magazine is captured in the gasket and is prevented from falling out of the magazine except under the force of the ram 174. Furthermore, the gasket 192 may possess sufficient flexibility to lift a lead off of the recording material whenever the pressure applied by the ram 174 is released. Positive retraction of the lead from the recording material is not essential; however, it may be desirable particularly with consumable marking materials which are softer than pencil leads and have a tendency to make marks even without pressure from the ram.

Figure 11:
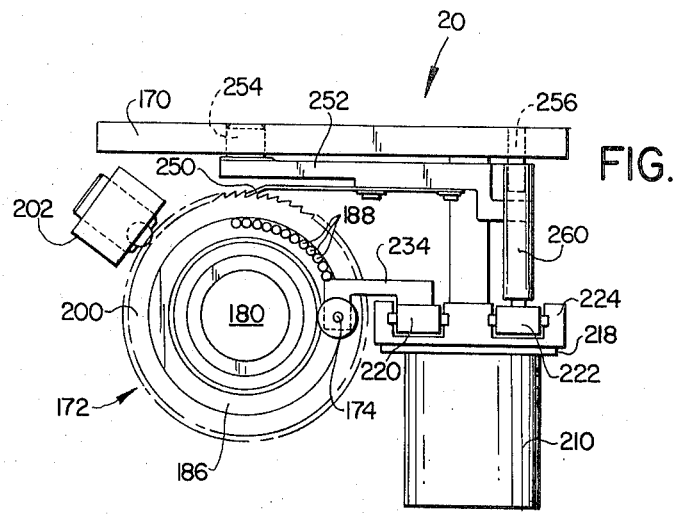
FIG. 11 is an enlarged top plan view of the plotting head in FIG. 9 with portions removed for clarity.

Circumscribing the upper end of the barrel 186 is a ratchet 200 which is also fixedly attached to the barrel for indexing the barrel and the channels 188 relative to the ram 174. As shown in FIG. 11, a ball detent 202 engages the ratchet teeth to hold the magazine 172 in each of a plurality of index positions wherein one of the channels 188 registers with the ram 174. In the embodiment illustrated, each tooth of the ratchet 200 corresponds to one of the channels 188 so that indexing of the magazine 172 by one ratchet tooth brings the ram 174 into registration with the next adjacent channel 188.

The mechanism which actuates the ram 174 also indexes the magazine 172. Before discussing the indexing mechanism, it is appropriate to consider the manner in which the ram 174 is operated to press and feed a lead through the magazine.

The actuating mechanism for the ram 174 includes a torque motor 210, a mass-balanced drive linkage comprised of a gear rack mechanism 212 and a coupling spring 214 interposed between the rack mechanism 212 and the ram 174. The drive shaft of motor 210 is connected to the rack pinion gear 216 by means of a large reduction gear 218 shown most clearly in FIGS. 9 and 10. The gear rack mechanism 212 includes two gear racks 220 and 222 which reciprocate in alternating fashion up and down in a common rack guide housing 224. Each end of the rack 220 carries a roller 228 which moves up and down in a guide channel in the housing 224. In the same manner the rack 222 includes rollers 230 which slide up and down in a corresponding guide channel in the housing. The housing 224 is fixedly mounted to the carriage plate 170 to guide the racks and the ram 174 in the vertical direction or a direction perpendicular to the axis of rotation of the plotting drum and the strip S of recording material at the point of contact with the material. A support arm 234 is rigidly connected to the rack 220 and projects laterally from the rack to the ram 174. The end of the support arm 234 carries a bushing 236 through which the ram 174 passes in sliding relationship to the arm. Clamping blocks 238 and 240 are fixed to the ram above and below the arm 234 with the spring 214 interposed between the arm and the lower clamping block 240. The ram is thusly connected to the rack 220 and torque motor 210 through a resilient coupling.

In operation, the torque motor 210 is energized and the rack 220 presses the feed ram 174 downwardly through a guide channel 242 in the bracket 171 as shown in FIG. 10 and into the tapered upper end of a channel 188 in the magazine 172. If a lead is in the channel 188, the lower end of the ram 174 makes contact with the lead and pushes the lower end of the lead through the gasket 192 out of the magazine and into contact with the strip of recording material on the plotting drum 22. As long as the torque motor 210 remains energized, a constant force or stylus pressure will be applied from the ram to the lead and a line trace will be generated on the recording material. As the lower end of the lead is consumed in a plotting operation, the torque motor 210 continues to advance the ram 174 through the channel 188 and thereby feeds the lead as needed. When the end of a programmed trace is reached, the torque motor 210 is deenergized to relieve the stylus pressure on the lead and, therefore, no further mark is produced on the recording material.

The coil spring 214 forms a resilient coupling between the torque motor 210 and the lead and in conjunction with the mass-balanced gear rack mechanism 212 isolates high-frequency vibrations between the ram 174 and motor 210 so that any roughness of the plottin drum or the recording material is not coupled back to the motor 210. This isolation permits a very light loading of the ram 174 by the motor.

The mass-balanced gear rack mechanism 212 is also desirable because it allows a small quantity of energy to be stored in the compressed spring 214 during a plotting operation, and at the end of a line trace when the torque motor 210 is deenergized, the stored energy imparts a slight movement to the mass-balanced linkage. During this movement, the slight momentum acquired by the rack mechanism carries the support arm 234 and the ram 174 upwardly out of contact with the lead in the channel 188. Consequently, it is not necessary to reverse the torque motor 210 each time the end of a programmed trace is reached to insure that no pressure is exerted on or no weight rests on the lead which would cause marks to be produced on the strip.

As shown on the plan view of the data head 20 in FIG. 11 where the support bracket 171 on the carriage plate 170 has been removed for clarity, the magazine 172 is indexed by means of pawl 250 carried by a lever 252 pivotally mounted in the carriage plate 170 on a pin 254. As the lever 252 oscillates, the resilient end of the pawl 250 indexes the magazine 172 by one tooth on the ratchet 200.

As shown in FIG. 10 the lever 252 is normally held against a dead pin 256 in the plate 170 at the position illustrated by a return spring 258 extending between the carriage plate 170 and the lever. The lever is actuated to index the magazine by a laterally projecting stud 260 mounted on the gear rack 222 so that contact is made with the lever 252 during downward movement of the rack 222 immediately after the lower end of the ram 174 is withdrawn from a channel 188 in the magazine 172. The downward motion of the rack 222 causing an indexing operation is initiated by reversing the direction of excitation and rotation of the torque motor 210 when the lower clamp block 240 on the ram 174 makes contact with a limit switch 270 indicating a low-lead condition. If the switch 270 is actuated while a trace is being made, the controller 14 shown in FIG. 1 will continue the plotting operation until the end of the trace is reached. At that point, torque motor 210 is reversed and the rack 220 is raised until the ram 174 is withdrawn from the magazine 172. At that same time, the rack 222 moves down and the stud 260 pushes the lever 252 downwardly against the spring 258 while the pawl 250 engaging the ratchet 200 indexes the ratchet 200 and magazine. The downward motion of the rack 222 under the driving forces of torque motor 210 is limited by the dead pin 256 fixed in the carriage plate 170 and the rectangular cutout 272 in the lever 252. The cutout 272 is selected to cause the pawl 250 to push the ratchet a distance equal to one ratchet tooth and, since each ratchet tooth corresponds to one of the channels 188, the magazine 172 is indexed to move the next magazine channel into registration with the ram 174. The ball detent 202 then locks the magazine in the new position.

A microswitch 274 positioned directly below the lever 252 is actuated after the magazine has been indexed. Actuation of the switch 274 informs the controller 14 that the indexing operation has been completed and the head 20 and plotting drum 22 can be moved to the starting point of the next trace. When the starting point is reached, the rotation of torque motor 210 is reversed by the controller 14 and the ram 174 moves downwardly into a channel 188 into contact with the newly indexed lead. Also, the return spring 258 moves the lever 252 and pawl to the position illustrated in FIG. 10 for the next indexing operation. If the new channel does not have any lead, the ram 174 moves directly to the bottom of its stroke and contacts switch 270 to initiate another indexing operation. The switch 274 may be used to count the number of indexing operations in the controller 14. When the count reaches a sum equal to the number of channels 188 distributed around the periphery of the magazine 172, a "lead-out" signal may be given and the controller may inhibit any further plotting until the magazine is reloaded and the controller is reset.

In another aspect of the present invention, the drum plotter 10 with the data head 20 described above may be utilized in a method of producing duplicate copies of the graphic information displayed on the recording material after a plotting operation. As mentioned above, consumable marking materials other than pencil leads may be employed in the head. There currently exist slender shafts of consumable marking material which contain a soluble dye. When a plot is drawn with such shafts, each trace contains the dye distributed uniformly throughout and the strip becomes a master from which duplicate copies can be produced in a dye transfer process. Dye transfer processes are old in the art and they are sometimes referred to as ditto processes.

Figure 13:
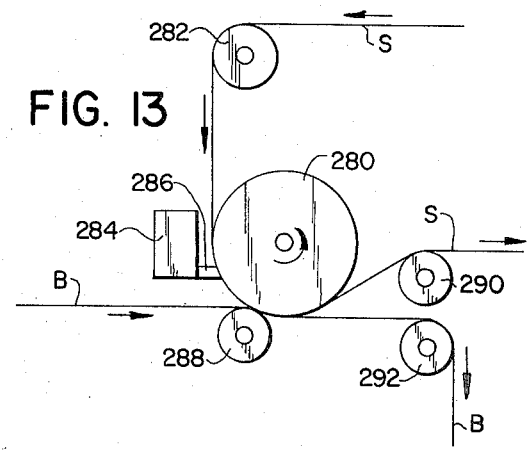
FIG. 13 is a schematic representation of a conventional dye-transfer printing process.

FIG. 13 illustrates schematically a spirit duplicator carrying out a conventional dye transfer process in which a strip S of plotting paper from the drum plotter 10 is utilized as the master. It will be assumed that the dye employed to mark the line traces on the strip S is a methylene blue dye soluble in methyl alcohol; however, dyes for other colors or several color dyes may be used. The strip S is guided over a bar or roller 282 toward a printing drum 280 of the duplicator with the trace containing the dye located on the outer surface of the strip facing away from the printing drum 280. As the strip is pulled around the drum 280, it is wetted by a spirit containing methyl alcohol from a reservoir 284 having a felt wick 286 wiping the outer surface. A blank strip B is also fed toward the printing drum 280 and the two strips S and B are brought into contacting relationship on the outer surface of the drum 280 by means of a pressing roller 288. At this point, a portion of the dye from the strip S is transferred onto the strip B so that a mirror image of the trace is produced on the strip B. As the two strips leave the printing drum 280 the strip S passes over a roller 290 and the strip B passes over roller 292 which separates the strips. Accordingly, the strip B receives an image of the graphic information plotted on the strip S and that image will be a mirror image since the dye transfer process inherently causes image reversal. More than one copy of the graphic information can be obtained by simply recycling the strip S against another blank strip and the process can be continued until substantially all of the dye on the strip S has been expended.

Because mirror or reversed images are not normally desired, the trace plotted on the master strip S should be the mirror image and then the image on the blank strip will be the true image desired. Reversing the plotted image is easily accomplished with plotters of the type illustrated in this application having two control axes, sometimes referred to as the X and Y coordinate axes, by simply reversing the relative movements of the plotting head and recording material along one of the coordinate axes. For example, it may be desirable to reverse the motion of the data head 20 over the strip of recording material as defined by the commands on the program tape 18. Such an operation is easily executed within the controller 14 itself since it requires a simple change in the command signal polarities.

Of course, the transfer dye may also be deposited on the strip of recording material as a liquid provided it dries before it is wound into the one of the strip rolls on the storage reels 60 or 62. The duplicating operation including the reversal of the image on the master strip would otherwise be the same as described above wherein the dye is suspended in a shaft of solid consumable marking material.

While the present invention has been described in a preferred embodiment, it should be understood that still other modifications and substitutions can be had without departing from the spirit of the invention. For example, the light sensor 90 employed to detect the lateral position of the recording material may not employ the photoresistive cells disclosed in FIGS. 3 and 4. Instead, mechanical sensors or other optical sensors which track the edge of the paper or other marking indicia along the paper can be used. The feed controls which regulate the lateral positioning of the recording material may be used in plotters other than the drum plotter for accurate tracking of the material relative to a data head. The construction of the side walls in the vacuum troughs to reduce electrostatic charge buildup can also be advantageously employed along any guide plate over which sheet material is advanced during a plotting or other operation. The specific structure illustrating the data head 20 for use with consumable marking material may be varied in detail as desired. It is not essential that the mechanical linkage connecting the torque motor 210 and feed ram 174 be a mass-balanced linkage; however, such linkage in the present application is desirable because it aids in high-frequency isolation and insures removal of pressure from the lead whenever the motor is turned off without having to reverse the motor. The dual rack mechanism 212 also provides a means for actuating the indexing mechanism connected to the magazine 172. A snubbing device can be connected to the mass-balanced linkage to damp the motions or forces carried by the linkage. The constant stylus pressure applied to the lead by the ram can be made adjustable by an adjustable resistor regulating the excitation voltage for the torque motor 210. Other motors such as an air cylinder can be substituted for the torque motor to produce the constant stylus pressure. The flexible gasket 192 at the lower end of the magazine 172 can be replaced with equivalent resilient retainers allowing the lead to be pressed through the magazine but prohibiting the lead from falling loosely onto the plotting paper under its own weight. It is not essential to use the magazine in the data head where reasonable life expectancy of the leads or other solid marking material is adequate for the intended plotting functions. There already exist flexible shafts of marking material which can be carried in rolls on the plotting head to permit extended plotting operations without the use of the magazine. A plotting operation performed with the consumable marking material may be for the purpose of producing a direct plot or for producing a master such as that from which duplicate copies are produced in the dye transfer process illustrated in FIG. 13. Accordingly, the present invention is described in several forms by way of illustration rather than limitation.

We claim:

1. Apparatus for winding a strip of sheet material onto a rotatably driven reel comprising:
   adjustable support means including a reel support having an adjustable member at one end of the reel defining the tram of the reel in the support for holding the strip and the rotatably driven reel with the axial direction of the reel and the longitudinal direction of the strip angularly adjustable relative to one another;
   motor means connected with the adjustable member in the adjustable support means for varying the angular adjustment of the axial direction of the reel and the longitudinal direction of the strip;
   sensing means for detecting the lateral position of the strip; and
   motor control means interconnecting the sensing means and the motor means for causing the angular adjustment of said axial and longitudinal directions to be varied to thereby limit the axial shifting of the strip as the strip is wound onto the reel.

2. Apparatus for winding a strip of sheet material as defined in claim 1 wherein the sensing means is located at a station along the strip in advance of the reel.

3. Apparatus for winding a strip of sheet material as defined in claim 1 wherein
   the sensing means comprises a light sensor positioned adjacent and detecting a longitudinal edge of the strip.

4. Apparatus for winding as defined in claim 1 wherein the sensing means comprises at least three photocells located generally in a linear array adjacent a longitudinal edge of the strip, the first of the cells being positioned under and covered by the strip, the second of the cells being located at the nominal position of the longitudinal edge of the strip and the third of the cells being laterally displaced away from the longitudinal edge of the strip.

5. Apparatus for winding as defined in claim 1 wherein the adjustable member is movable relative to the rest of the reel support in a direction generally parallel with the longitudinal direction of the strip at the reel.

6. Apparatus for winding as defined in claim 1 wherein
the reel support includes a first journal bearing fixedly located on the support and connecting with a first axial end of the reel, and a second journal bearing mounted on the adjustable member and connecting with the other or second axial end of the reel.

7. Apparatus for winding as defined in claim 6 wherein
the sensing means is located adjacent the longitudinal edge of the strip wound onto the reel adjacent the first axial end.

8. Apparatus for winding as defined in claim 6 wherein the adjustable member of the reel support comprises a slide block carrying the second journal bearing at the second axial end of the reel.

9. In a feed mechanism having a driving drum which engages and advances a strip of sheet material along a feed path from a rotatable storage reel to the drum, the drum having one set of drive sprockets fixed at one axial end to engage apertures along one longitudinal edge of the strip and another set of drive sprockets shiftable axially on the drum at the other axial end to engage apertures along the other longitudinal edge of the strip, the improvement comprising: means for selectively steering the strip of sheet material toward a laterally offset position at a station in advance of the drum as the strip moves toward the drum, the position being laterally offset toward said other longitudinal edge of the strip engaged by the axially shiftable set of drive sprockets.

10. The improvement as defined in claim 9 in the feed mechanism having a reversibly driven drum wherein
the means for selectively steering includes energizing means responsive to strip advancement from the storage reel toward the drum.

11. The improvement as defined in claim 9 further including means positioned along the feed path between the storage reel and the drum for holding the strip of sheet material in a loop.

12. The improvement as defined in claim 11 wherein the means for holding includes
a support beam extending transversely of the strip along the feed path between the storage reel and the drum.

13. The improvement of claim 11 wherein the means for selectively steering comprises means for adjusting the angular relationship of the rotatable storage reel and the drum to thereby shift the depending portion of the loop laterally of the strip.

14. The improvement as defined in claim 9 wherein the means for selectively steering comprises means for adjusting the angular relationship of the rotatable storage reel and the drum.

15. The improvement as defined in claim 14 wherein the means for adjusting comprises an adjustable member supporting the storage reel at one axial end and a displacement motor connected to the adjustable member.

16. The improvement as defined in claim 15 wherein the adjustable member at one axial end of the storage reel is slidably adjustable generally perpendicular to the axis of the storage reel and in the same general direction as the longitudinal edge of the strip of sheet material at said one axial end of the reel.

17. The improvement of claim 11 wherein
the means for holding comprises a vacuum trough located adjacent the drum on the feed path between the storage reeel and the drum.

18. The improvement of claim 8 further including a pair of vacuum troughs, vacuum ducts interconnecting the troughs and a vacuum pump connected to the ducts for evacuating the troughs, the troughs being located at opposite sides of the drum respectively along the feed path followed by the sheet material over the drum.

19. Apparatus for feeding a strip of sheet material longitudinally back and forth along a feed path over a drum and between first and second rotatable storage reels on which the strip is wound and unwound at opposite sides of the drum comprising in combination:
an adjustable support holding the first storage reel for angular adjustment of the axis of rotation of the reel relative to the longitudinal direction of the strip;
a motor connected to the adjustable support for positioning the support and angularly adjusting the storage reel and strip;
a vacuum trough located along the feed path of the strip between the first storage reel and the drum for holding a portion of the strip between the first storage reel and the drum in a loop; and
strip position sensing means located along the strip between the vacuum trough and the first storage reel and connected to the motor for controlling the adjustment of the first storage reel in accordance with the sensed strip position.

20. Apparatus for feeding a strip of sheet material as defined in claim 19 further including:
a first support beam extending transversely of the strip and supporting the strip between the vacuum trough and the first storage reel; and wherein
the strip position sensing means is located on the support beam.

* * * * *

UNITED STATES PATENT AND TRADEMARK OFFICE
Certificate

Patent No. 3,857,525                            Patented December 31, 1974

Heinz Joseph Gerber, Leonard G. Rich, Ronald Bruce Webster, and Robert Louis Martino Application having been made by Heinz Joseph Gerber, Leonard G. Rich, Ronald Bruce Webster, and Robert Louis Martino, the inventors named in the patent above identified, and The Gerber Scientific Instrument Company, South Windsor, Conn., a corporation of Connecticut, the assignee, for the issuance of a certificate under the provisions of Title 35, Section 256, of the United States Code, adding the names of Earle Merritt Chase and Anthony D'Onofrio as joint inventors, and a showing and proof of facts satisfing the requirements of the said section having been submitted, it is this 30th day of September 1975, certified that the names of the said Earle Merritt Chase and Anthony D'Onofrio are hereby added to the said patent as joint inventors with the said Heinz Joseph Gerber, Leonard G. Rich, Ronald Bruce Webster, and Robert Louis Martino.

FRED W. SHERLING,
*Associate Solicitor.*

UNITED STATES PATENT OFFICE
CERTIFICATE OF CORRECTION

Patent No. 3,857,525   Dated December 31, 1974

Inventor(s) Heinz Joseph Gerber et al.

It is certified that error appears in the above-identified patent and that said Letters Patent are hereby corrected as shown below:

Column 5, line 8, "mounsed" should read -- mounted --.

Column 18, line 25, "8" should read -- 9 --.

Signed and Sealed this

Twenty-first Day of September 1976

[SEAL]

Attest:

RUTH C. MASON
*Attesting Officer*

C. MARSHALL DANN
*Commissioner of Patents and Trademarks*